US007590681B1

(12) United States Patent (10) Patent No.: US 7,590,681 B1
Chang et al. (45) Date of Patent: Sep. 15, 2009

(54) METHOD AND SYSTEM FOR MANAGING AND DELIVERING WEB CONTENT TO INTERNET APPLIANCES

(75) Inventors: Daniel T. Chang, Belmont, CA (US); Jay Raju, Fremont, CA (US); Rodric C. Fan, Fremont, CA (US); Haiqi Chen, Sunnyvale, CA (US); Paul Chen, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 905 days.

(21) Appl. No.: 09/632,897

(22) Filed: Aug. 7, 2000

(51) Int. Cl.
*G06F 15/16* (2006.01)

(52) U.S. Cl. .................. 709/203; 709/206; 709/214; 709/228

(58) Field of Classification Search .............. 705/203; 709/203, 206, 214, 228
See application file for complete search history.

(56) References Cited

U.S. PATENT DOCUMENTS

| 5,918,237 | A | * | 6/1999 | Montalbano | 715/206 |
|---|---|---|---|---|---|
| 6,272,532 | B1 | * | 8/2001 | Feinleib | 709/206 |
| 6,278,449 | B1 | * | 8/2001 | Sugiarto et al. | 709/219 |
| 6,314,439 | B1 | * | 11/2001 | Bates et al. | 715/209 |
| 6,405,223 | B1 | * | 6/2002 | Kelley et al. | 715/205 |
| 6,463,354 | B1 | * | 10/2002 | Pintsov | 700/227 |
| 6,480,191 | B1 | * | 11/2002 | Balabanovic | 345/419 |
| 6,560,640 | B2 | * | 5/2003 | Smethers | 709/219 |
| 6,594,699 | B1 | * | 7/2003 | Sahai et al. | 709/228 |
| 6,801,936 | B1 | * | 10/2004 | Diwan | 709/219 |
| 6,980,175 | B1 | * | 12/2005 | Narayanaswami | 345/2.3 |
| 2001/0013123 | A1 | * | 8/2001 | Freeman et al. | 725/34 |
| 2002/0002596 | A1 | * | 1/2002 | Sugiarto et al. | 709/218 |
| 2002/0091789 | A1 | * | 7/2002 | Katariya et al. | 709/214 |
| 2003/0028380 | A1 | * | 2/2003 | Freeland et al. | 704/260 |
| 2004/0107208 | A1 | * | 6/2004 | Seet et al. | 707/102 |

\* cited by examiner

*Primary Examiner*—Ario Etienne
*Assistant Examiner*—Barbara N Burgess
(74) *Attorney, Agent, or Firm*—Swernofsky Law Group PC

(57) ABSTRACT

A method and a system allow presentation of web pages to an internet appliance (e.g., a hand-held computer, a mobile telephone, or a digital personal assistant) according to user preferences. The user preferences are captured by a management server, which provides a web page customization service in conjunction with a document manager, which parses the web pages to identify information units. The customized web pages are stored in a database using a standardized hypertext document representation device, such as XML. The customized web pages are accessible from a portal adapted for accessing by the internet appliance. In one implementation, the user is also offered pre-configured resources for frequently used services when accessing the portal using the internet device.

23 Claims, 7 Drawing Sheets

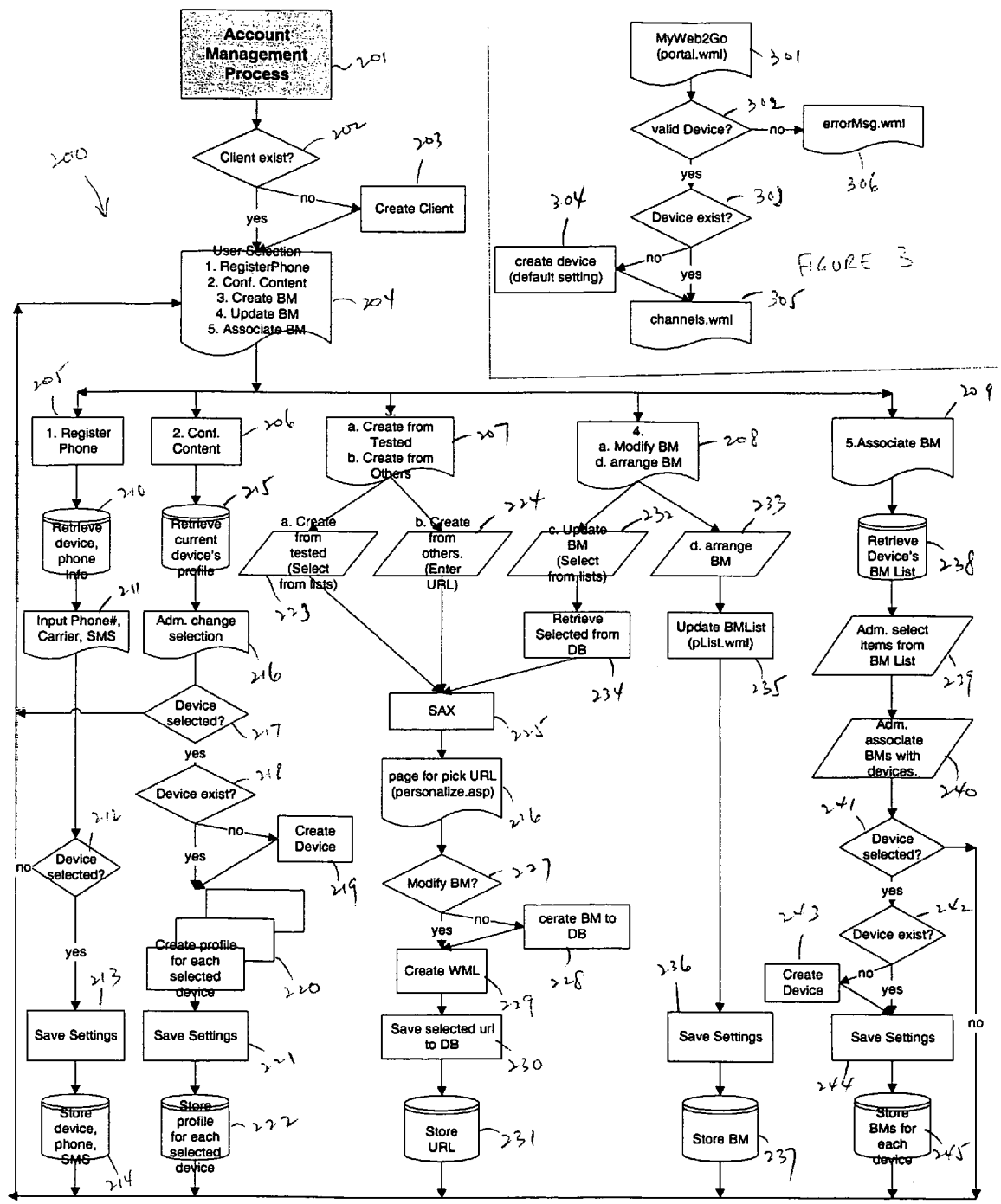

YAHOO!

Auctions · Messenger · Check Email · What's New · Personalize · Help

NEW! Yahoo! Photos — upload, share, print

Win Your Ideal Getaway

Win a new office from Staples.com

[search] advanced search

Shop · Auctions · Classifieds · Shopping · Travel · Yellow Pgs · Maps · Media · News · Sports · Stock Quotes · TV · Weath
Connect · Chat · Clubs · Games · GeoCities · Greetings · Invites · Mail · Messenger · Personals · People Search · For Kids
Personal · My Yahoo! · Addr Book · Calendar · Briefcase · Photos · Alerts · Bookmarks · Companion · Bill Pay   more...

Yahoo! Shopping - Thousands of stores. Millions of products.

| Departments | Stores | Features |
|---|---|---|
| · Apparel   · Beauty | · Macy's | · Summer Fun |
| · Luxury    · Sports | · Tavolo | · Special Offers |
| · Computers · Music  | · Sephora | · Top-selling CDs |
| · Electronics · Video/DVD | · Banana Republic | · Gift Ideas |

Arts & Humanities
Literature, Photography...

Business & Economy
B2B, Finance, Shopping, Jobs...

Computers & Internet
Internet, WWW, Software, Games...

Education
College and University, K-12...

Entertainment
Cool Links, Movies, Humor, Music...

Government
Elections, Military, Law, Taxes...

Health
Medicine, Diseases, Drugs, Fitness...

News & Media
Full Coverage, Newspapers, TV...

Recreation & Sports
Sports, Travel, Autos, Outdoors...

Reference
Libraries, Dictionaries, Quotations...

Regional
Countries, Regions, US States...

Science
Animals, Astronomy, Engineering...

Social Science
Archaeology, Economics, Languages...

Society & Culture
People, Environment, Religion...

In the News
- Starr spokesman charged for leaks
- US ready for missile-defense test
- Body of Julius Erving's missing son found
- Wimbledon - Tour de France more...

Marketplace
- Y! Auctions - Pokemon, Longaberger, autos, 'N Sync
- Free 56K Internet Access
- Y! Travel - plan your summer vacation

Broadcast Events
- 12pm ET : Western Open - 2nd round
- 2pm : Walter Trout listening party
- 7pm : Yankees vs. Mets more...

Inside Yahoo!
- Y! Movies - Scary Movie, The Kid, Perfect Storm, The Patriot
- Yahoo! Radio - tune in to your favorite station
- Fantasy Baseball - midseason sign-ups, 3 days left!

---

Local Yahoo!s
*Europe* : Denmark - France - Germany - Italy - Norway - Spain - Sweden - UK & Ireland
*Asia Pacific* : Asia - Australia & NZ - China - Chinese - HK - India - Japan - Korea - Singapore - Taiwan
*Americas* : Argentina - Brazil - Canada - Mexico - Spanish
*U.S. Cities* : Atlanta - Boston - Chicago - Dallas/FW - LA - NYC - SF Bay - Wash. DC - more...

More Yahoo!s
*Guides* : Autos - Careers - Health - Outdoors - Pets - Real Estate - Yahooligans!
*Entertainment* : Top - Astrology - Broadcast - Games - Movies - Music - Net Events - Television
*Finance* : Top - Banking - Bill Pay - Insurance - Loans - Taxes - FinanceVision
*Local* : Top - Classifieds - Events - Lodging - Maps - Restaurants - Yellow Pages
*News* : Top Stories - Business - Entertainment - Lottery - Politics - Sports - Technology - Weather
*Publishing* : Briefcase - Clubs - Invites - Photos - Home Pages - Message Boards - Store

FIGURE 6

METHOD AND SYSTEM FOR MANAGING AND DELIVERING WEB CONTENT TO INTERNET APPLIANCES

BACKGROUND OF THE INVENTION

1. Field of the Invention

The present invention relates to accessing to information over the Internet. In particular, the present invention relates to a customized access to information over the Internet by various internet appliances with various processing capabilities.

2. Discussion of the Related Art

As the Internet has become a preferred medium for information access and dissemination, many different devices (e.g., mobile phones, personal digital assistants and handheld computers) can now be used to access information on the Internet. In general, these devices typically have much lesser text and graphical processing capabilities than a conventional desktop computer. (For convenience, in the remainder of this description, these devices are collectively referred to as "internet appliances".) As much of the information on the Internet is organized for access by a desktop computer using a hypertext protocol (e.g., http), access to such information by a device other than a desktop computer can be inefficient. For example, many web pages are designed with a high-resolution graphical display in mind. Even when possible, accessing such web pages from a mobile telephone without a graphical display and providing only a limited number of short lines for text display can be a very frustrating experience.

To accommodate the different capabilities of the internet appliances, in the prior art, an operator of a website typically provides for each supported internet appliance a specialized "edition" of the website accessible through a specialized gateway. For example, since the current generation of mobile telephones are typically only capable of displaying text of a small number of characters per line, an operator would provide specially designed text-only "stripped down" web pages accessible through a wireless access protocol (WAP) gateway. In most instances, information available in the general edition of the web pages are included or excluded by the designer or operator based on its resource availability or other criteria, without user participation. Often, therefore, information important to some users is arbitrarily excluded, thereby severely reducing the utility of the web pages.

Where a specialized website is not available, the gateway would provide only the text from the web pages and discard or ignore graphical information, animation or other functions embedded in the web pages. In such an instance, no attempt is typically made to filter the information based on the content of a web page. Consequently, a relatively small web page can result in the user pressing the "scroll" key a large number of times. Many users therefore do not consider internet appliances to be suitable for serious information retrieval purposes.

SUMMARY OF THE INVENTION

The present invention provides a method and a system for customizing a structured document (e.g., a web page) for delivery to an internet appliance. The present invention allows a structured document to be customized according to a user's preferences and according the particular requirements of an accessing device, rather than arbitrarily determined by a gateway operator or a web service provider of the structured document.

In one embodiment, a method of the present invention includes: (a) identifying information units in the structured document; (b) selecting one or more of the information units for delivery; (c) creating in a database a second structured document which includes the selected information units; and (d) delivering the second structured document to the internet appliance. In one implementation, the second structured document is provided in the database in the form of an XML document.

In one embodiment, a management server creates a menu for selection, which includes the information units identified in the structured document. The menu is typically presented to the user who is using a conventional browser running on a machine with a high-resolution graphical display. Typically, after the customization is complete, subsequent access to the customized structured document is provided to an internet appliance with limited bandwidth or display capability, such as a mobile telephone, a personal digital assistant, or a handheld computer.

Typically, the user logs into the management server using standard verification procedures (e.g., providing a user name and a password). The user typically registers the intended internet appliance with which he or she intends to access the customized structured documents. Registration refers to a procedure for identifying the device and its capabilities. To create the customized document, the user may select from a pre-formed list, or by specifying the structured document using a uniform resource locator (URL). The list of customized structured document is stored, in one implementation, as a list of bookmarks.

In one embodiment, the internet appliance includes means for determining the internet appliance's geographical location. In that embodiment, the operator of the customization service also offers pre-configured resources (i.e., web pages) providing location-specific information, such as travel information, traffic condition reports, etc. These pre-configured resources can be updated on demand, at specified frequency or as the location of the internet appliance changes.

In one embodiment, the customized structured documents are created taking into consideration the limited capabilities of a target internet appliance. To inform the management server of the internet appliance's capabilities, a device profile is created in a database.

To support a management server, in accordance with the present invention, a database accessible by the management server includes (a) a user record; (b) a device record identifying an internet appliance; (c) a client record identifying a browser running on the internet appliance; (d) a user_client record associating the user record with the client record; and (e) a device profile record associating the user_client record with the device record. In one embodiment, the database further includes a channel record associated with the user_client record to represent a pre-configured resource. To associate the customized structured documents with the user and the associated device, a site record is provided associating the user_client record. In turn, a customization record associates the site record with modification of the resource or structured document in accordance with the device_profile record.

In one embodiment, a document customization system of the present invention includes: (a) a management server offering a document customization service to a user; (b) a document manager associated with the management server performing the document customization service to structured documents identified by the user; (c) a database accessible by the document manager, the database storing customized structured documents resulting from the document customization service; and (d) a portal for accessing the customized structured documents in the database. The document manager parses a structured document to identify information units in the structured document. In one implementation, the customized structured documents are stored in a hypertext format, such as XML.

In one embodiment, the management server provides a user a web page-based interface to the document manager.

The present invention is better understood upon consideration of the detailed description below and the accompanying drawings.

BRIEF DESCRIPTION OF THE DRAWINGS

FIG. 2 is a flow diagram 200 illustrating interactions between management server 105 and a user during a management session, in accordance with the present invention.

FIG. 3 is a flow diagram 300 illustrating the interactions between an internet appliance and portal 108 during an access of web resources by the internet appliance, in accordance with the present invention.

FIG. 6 shows a web page illustrating one application of the present invention.

DETAILED DESCRIPTION OF THE PREFERRED EMBODIMENTS

Figure 1:
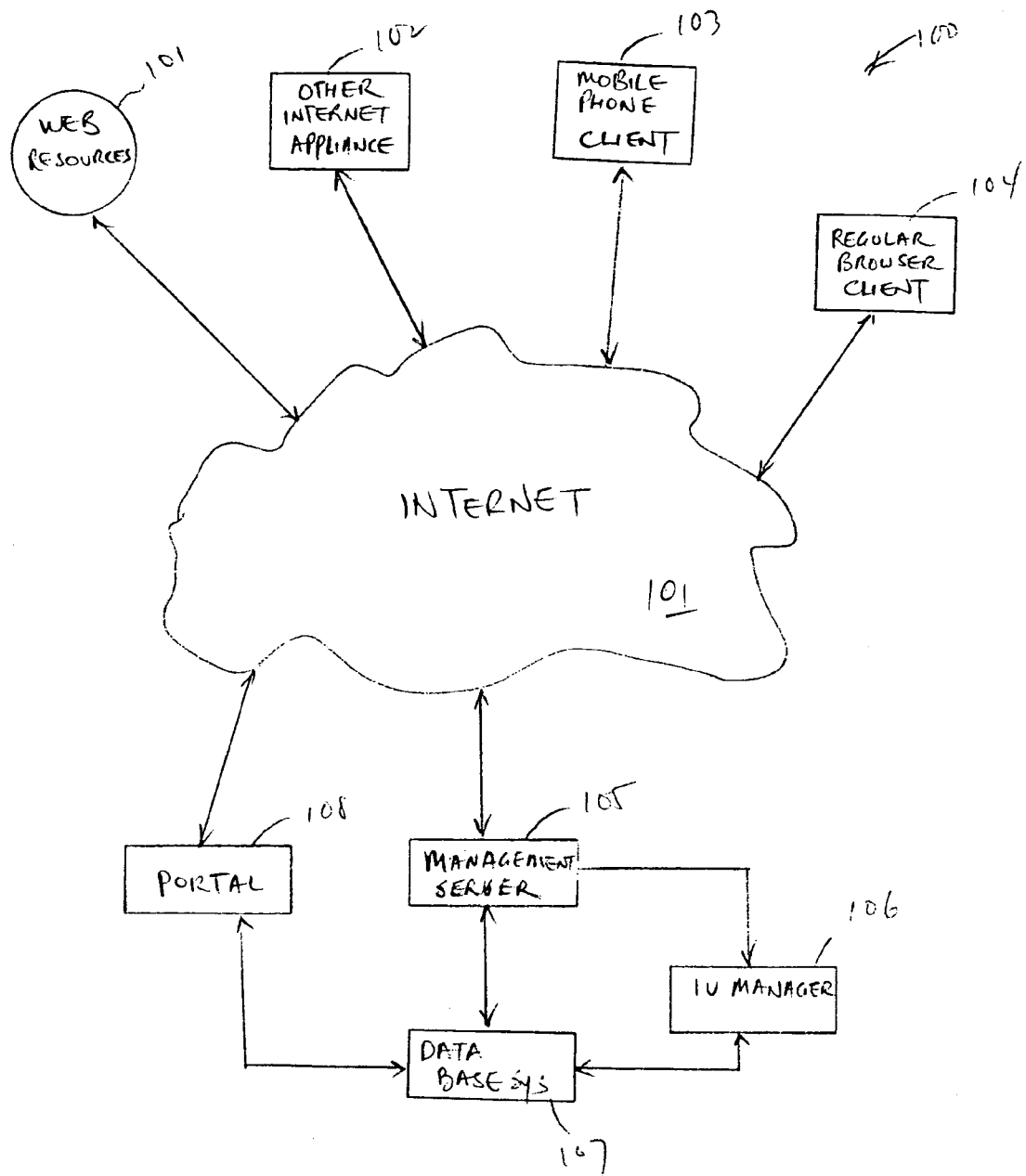
FIG. 1 is a block diagram 100 of a system providing customized access to web content in accordance with one embodiment of the present invention.

The present invention allows a user customized access to any web page on the Internet using an internet appliance. Unlike customized access in the prior art, the user, rather than the operator of a web page, controls the selection of web material to be delivered when accessed using an internet appliance. Further, under the present invention, a user can set up a different customized access to a web page according to the individual capabilities of each internet appliance used. To simplify this detailed description, like elements among the figures are assigned like reference numerals.

FIG. 1 is a block diagram of system 100 providing customized access to web content in accordance with one embodiment of the present invention. In system 100, as shown in FIG. 1, management server 105 provides an interface ("management session") through which a user can customize selected web content for later access using one or more internet appliances through portal 108. Typically, a user accesses management server 105 using a "traditional" web browser. By a "traditional" web browser is meant a web browser, such as Internet Explorer available from Microsoft Corporation, Redmond, Wash. which is typically run from a desktop or lap-top computer, with relatively high-resolution graphical capabilities.

As explained in further detail below, management server 105 is associated with a document database system 107. According to the present invention, web content is treated as structured documents consisting of inter-related "information units." A typical web page written in HTML, XML, SGML, or another marked up language is an example of a structured document. Such a structured document typically includes text, graphical images, executable application programs ("applets"), and embedded links to other structured documents. In the embodiment shown in FIG. 1, document manager 106 parses a structured document to break down the structured document into component inter-related information units and stores the information units into database 107. The user, through document manager 106, can manipulate these information units to create new documents, which can be output in various formats (e.g., HTML, Microsoft Word, WML, PHTML etc.). In one embodiment, structured documents are stored in database 107 as XML documents. The elements of an XML document can be treated as information units.

One example of a document manager suitable for use in conjunction with the present invention is disclosed in a copending patent application (the "Copending Application"), entitled "Method and System for Managing Reusable Information Units," Ser. No. 60/132,674, filed on May 4, 2000, which claims priority to a provisional patent application, entitled "Method and System for Managing Reusable. Information Units,". Ser. No. 60/132,674, filed May 5, 1999. The Copending Application is hereby incorporated by reference in its entirety. A document manager related to the Copending Application, which is also suitable for use in conjunction with the present invention is the Directive product, offered by Hynet Technologies.

Portal 180 is a gateway provided for communication with a mobile device, such as a web browser 103 running on a mobile telephone, or an information retrieval application program 102, running on an internet appliance (e.g., the iLocator Module from @Road, Inc.) Communication with portal 180 is performed using a protocol specific to the internet appliance (e.g., wireless application protocol (WAP) for a cellular or mobile telephone).

In one application, a user specifies through manager 105 a number of hyperlinks—which are pointers to other information units—of a web page to be made selectable from a mobile telephone. During a subsequent access to the web page through portal 108, portal 108 retrieves the modified web page—i.e., processed to include the specified hyperlinks—from database 107, and made the hyperlinks available for selection from the display device on the mobile telephone. When portal 108 retrieves the web page from database 107, if the web page is provided as a reference in database 107, access to the corresponding web resource (e.g., web resource 101) over the internet may be performed.

In one application, the operator of management server 105 also provides a number of pre-configured resources ("channels") for each user. In conjunction with a method for determining the user's location, these pre-configured resources can be used to provide, for example, user location-specific information. For example, in one embodiment, an internet appliance can be provided a device for determining the user's present location using either a global positioning system (GPS) or a triangulation system (e.g., a cellular phone system). With such a means for determining the user's location, the channels can be used to deliver, for example, local traffic conditions and travel information (e.g., nearby service stations, restaurants, hotels, shopping centers etc.). In one embodiment, the user can further customize the channels by providing parametric values of his or her preferences, such as a range of distances within which the channels would deem the information relevant, and a frequency of channel update.

Figure 4:
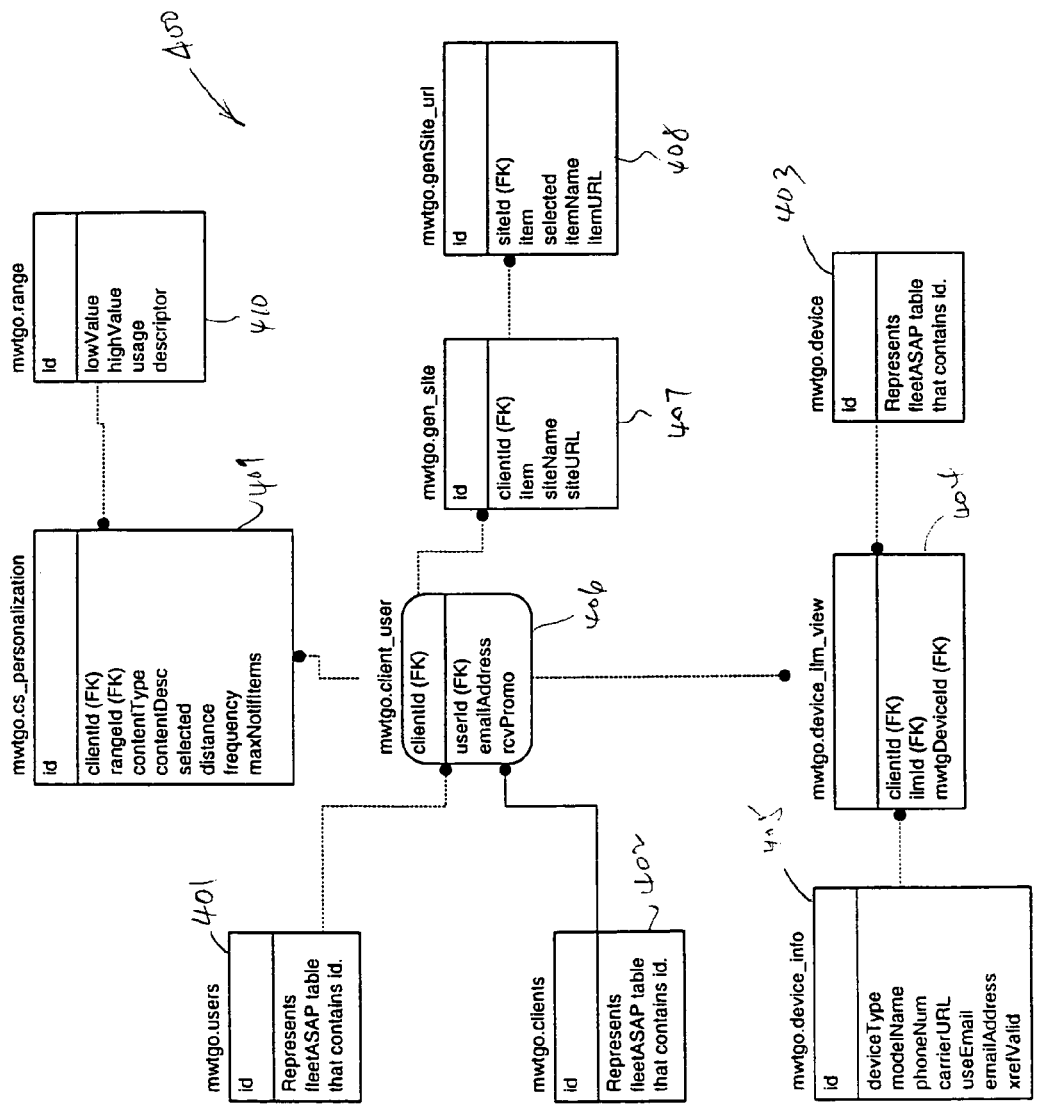
FIG. 4 shows a data structure 400 suitable for use with the operations of management server 105.

FIG. 2 is a flow diagram 200 illustrating interactions between management server 105 and a user during a management session, in accordance with the present invention. As shown in FIG. 2, at step 201, the user enters the management session from an entry point, such as the home page of the operator of management server 105 (e.g., http://www.atroad.com). In this instance, access to the user records is provided only upon proper identity verification procedure (step 202), such as by the user providing a user name and a password. If the user is not a registered user, registration may occur at step 203. In one embodiment, a user is associated with two files: "bmList.txt" and "menu.wml". "bmList.txt" is a file listing customized resources. ("bookmarks") associated—with the user. Portal 108 reads "menu.wml" to create a suitable menu for web content navigation using an internet appliance. FIG. 4 shows a data structure 400 suitable for use with the operation of management server 105. For each user, a user record 401 is assigned.

In this example, upon entering the management session, the user is presented (step 204) a menu from which the user can select one of five procedures: (1) register a device, (2) configure a device, (3) create a bookmark, (4) modify a bookmark, and (5) associate a bookmark to a registered device.

From the menu of step 204, if the user elects to register a device (step 205), the user identifies the device to be registered from a list of devices (e.g., a particular make and model of a mobile telephone) known to management server 105. The user then enters identification and operational information specific to device (step 211), confirms the information (step 212) and creates and saves the device record into management server 105's device data base. (steps 213 and 214). For each device, management server 105 retrieves user_client record 406, which associates client record 402 with user record 401. (Client record 402, shown in FIG. 4, identifies a client—the identity of the subscriber to the current service). Management server 105 then creates device profile record 404, which associates physical device record 403 with user_client record 406. Physical device record 403 identifies the physical device in the database and references device information record 405, which provides additional information regarding the operational characteristics or attributes of the physical device (e.g., telephone number assigned to the device, email address to send any electronic mail to the device, model number etc.) Management server 105 then returns the user to step 204.

From the menu of step 204, if the user elects to configure a registered device (step 206), management server 105 retrieves the profile of an existing device (step 216), and allows the user to edit the retrieved profile. When the user confirms the changes made (step 217), the user is allowed to authorize overwriting the existing device record (step 218), or to save the modified profile for a new device (step 219). The same profile can be applied to different device records (step 220). When the modifications are confirmed and saved (steps 221 and 222), management server 105 returns the user to step 204. In one embodiment, step 206 can also be used similarly to retrieve and modify the configuration of a channel. As shown in FIG. 4, channel personalization record 409 and range value record 410 are created to support these pre-configured channels. Channel personalization record 409, which includes identities of the channels the user has selected, associates the configurations of these channels to user_client record 406. Channel personalization record 409 also associates with each channel valid range values defined in range value record 410. A procedure similar to that disclosed in steps 215-222 can be used to allow a modification of a channel configuration (e.g., changing range values).

From the menu of step 204, if the user elects to create a bookmark (step 207), management server 105 allows the user to create a bookmark from either a pre-processed list (step 223) of web resources, or enters a uniform resource locator. ("URL") to identify a web resource not on the list (step 224). From either choice, the web resource is retrieved from the appropriate server (e.g., server 101 of FIG. 1) and processed (step 225) to identify the information units in the resource or structured document, using document manager 106. Manager 106 can be, for example, the document manager described in the Copending Application mentioned above. Processing the retrieved resource is described in further detail below in conjunction with FIGS. 5 and 6.

Figure 7:
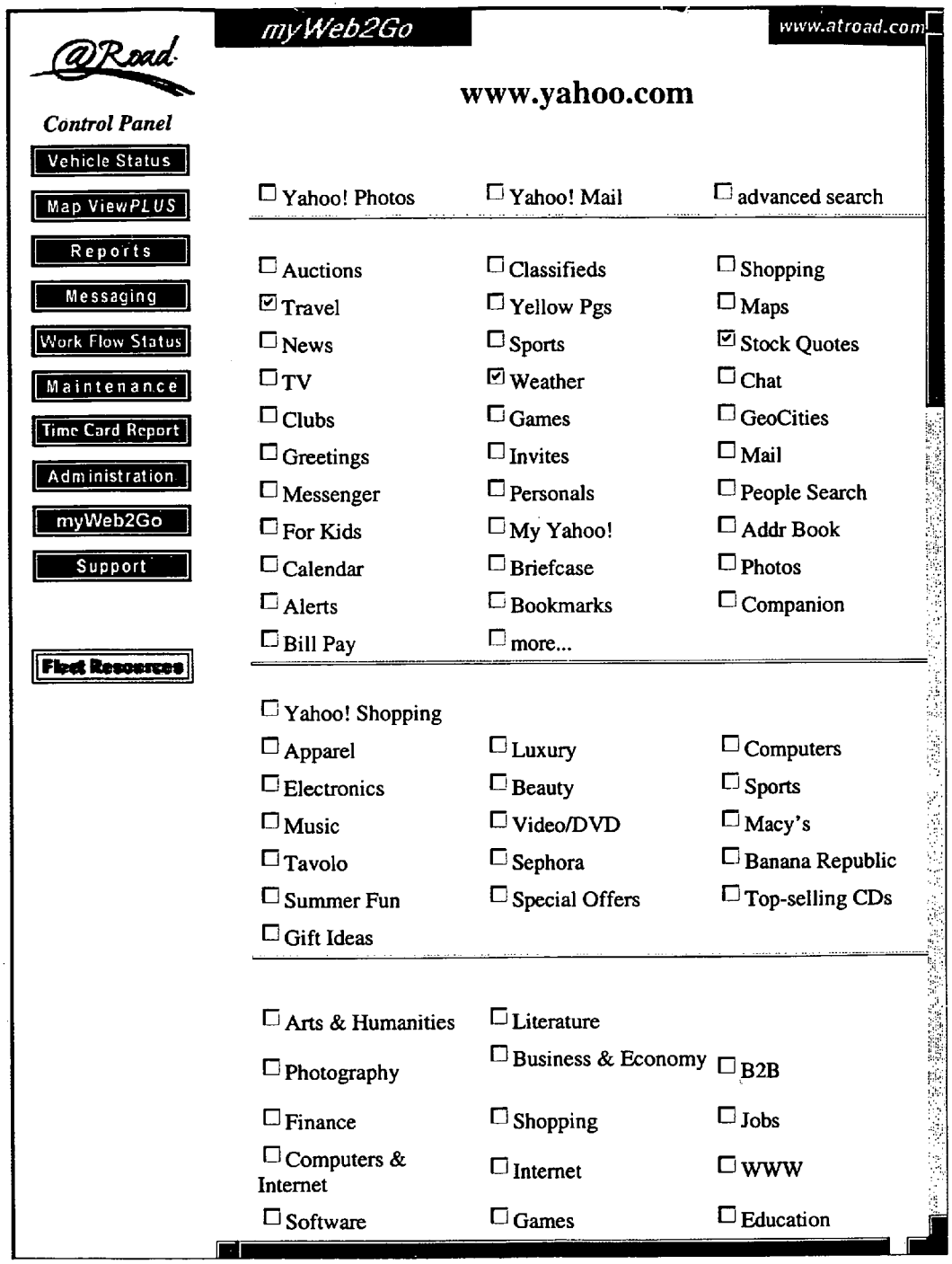
FIG. 7 shows a menu listing information units identified during processing of the web page of FIG. 6 by a document manager, in accordance with one embodiment of the present invention.
Figure 8:
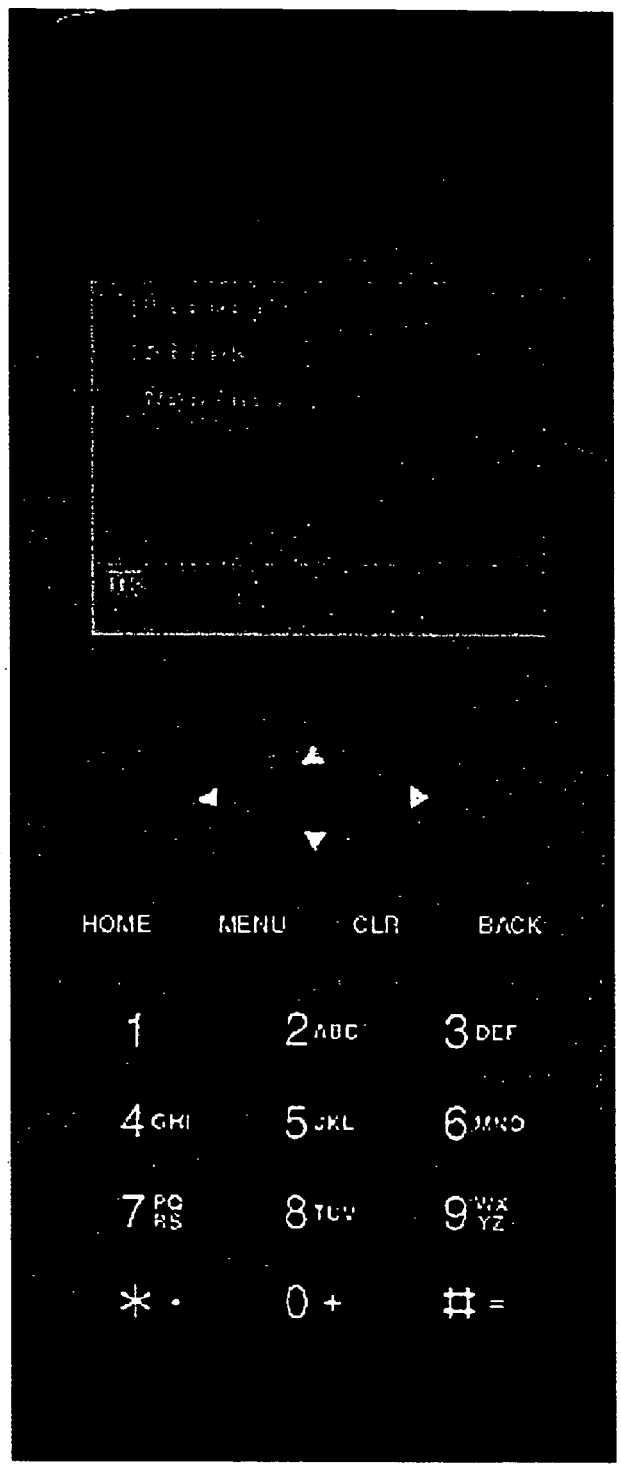
FIG. 8 shows the image of a processed web page received by an internet appliance, based on user preference determined from the menu listing of FIG. 7.

Once processed, document manager 106 allows the user to customize the use of the resource (step 226). For example, in one embodiment, the user is allowed to identify the information units to be delivered when accessing a resource from a specified internet appliance. This example is illustrated in FIGS. 6-8. FIG. 6 shows a web page from http://www.yahoo.com. Management server 105 allows a user to customize access to this web page from an internet appliance with limited display capabilities, such as a mobile telephone. To achieve the customization, document manager 106 parses the web page to identify the information units referenced in the page (in this case, the information units represented by the hyperlinks). The information units identified can be presented for user selection on a menu page, such as that shown in FIG. 7. As shown in FIG. 7, the user selects the "travel", "stock quotes", and "weather" items on the menu. When the user accesses the web page using the browser on the mobile telephone, document manager 106 delivers only the selected links "travel", "stock" and "weather" of the web page for further user selection, as shown in FIG. 8.

For each bookmark, management server 105 creates a corresponding site record 407 (FIG. 4), which identifies the web site corresponding to the bookmark, and provides customized content record 408, which details user-provided customization of the web site (e.g., list of selected resources at the home page of the website).

Upon completing the user operation at step 226, if the bookmark is already existing (i.e., from the pre-processed list), the bookmark is modified to reflect the user customization (step 227). Otherwise, a new bookmark is created (step 228). Based on the user's input, a new document suitable for delivery to the specified internet appliance is created (step 229). (In this example, the specified device is a wireless device having a client browser capable of receiving WML documents). The bookmark thus created or modified is then confirmed and saved into the database system 107 (steps 230 and 231). Management server 105 then returns the user to the menu of step 204.

From the menu of step 204, if the user elects to modify a bookmark (step 208), management server 105 allows the user to modify a bookmark from either the list of bookmarks associated with the user (step 234), or allows the user to edit the list of bookmarks itself (step 233). If the user selects an existing bookmark to modify, the bookmark is retrieved from database system 107 (step 234) and the steps 225-231 described above are carried out. Otherwise, the user is allowed to edit the list of bookmarks at step 235. The edited bookmark list is confirmed and saved into database 107 (steps 235 and 237). Management server 105 then returns the user to step 204.

From the menu of step 204, if the user elects to associate a bookmark with a registered device (step 209), management server 105 retrieves the list of bookmarks associated with a specified device (step 238) and allows the user to select from that list bookmarks to be associated with other devices (step 239). The user can then associated each selected bookmark with one or more devices selected from a list of registered devices (step 240). In fact, management server 105 allows association not only with registered devices (step 242), additional devices can also be created (step 243). The associations of bookmarks with devices are confirmed and saved into database 107 (steps 244 and 245). Management server 105 then returns the user to step 204.

Figure 5:
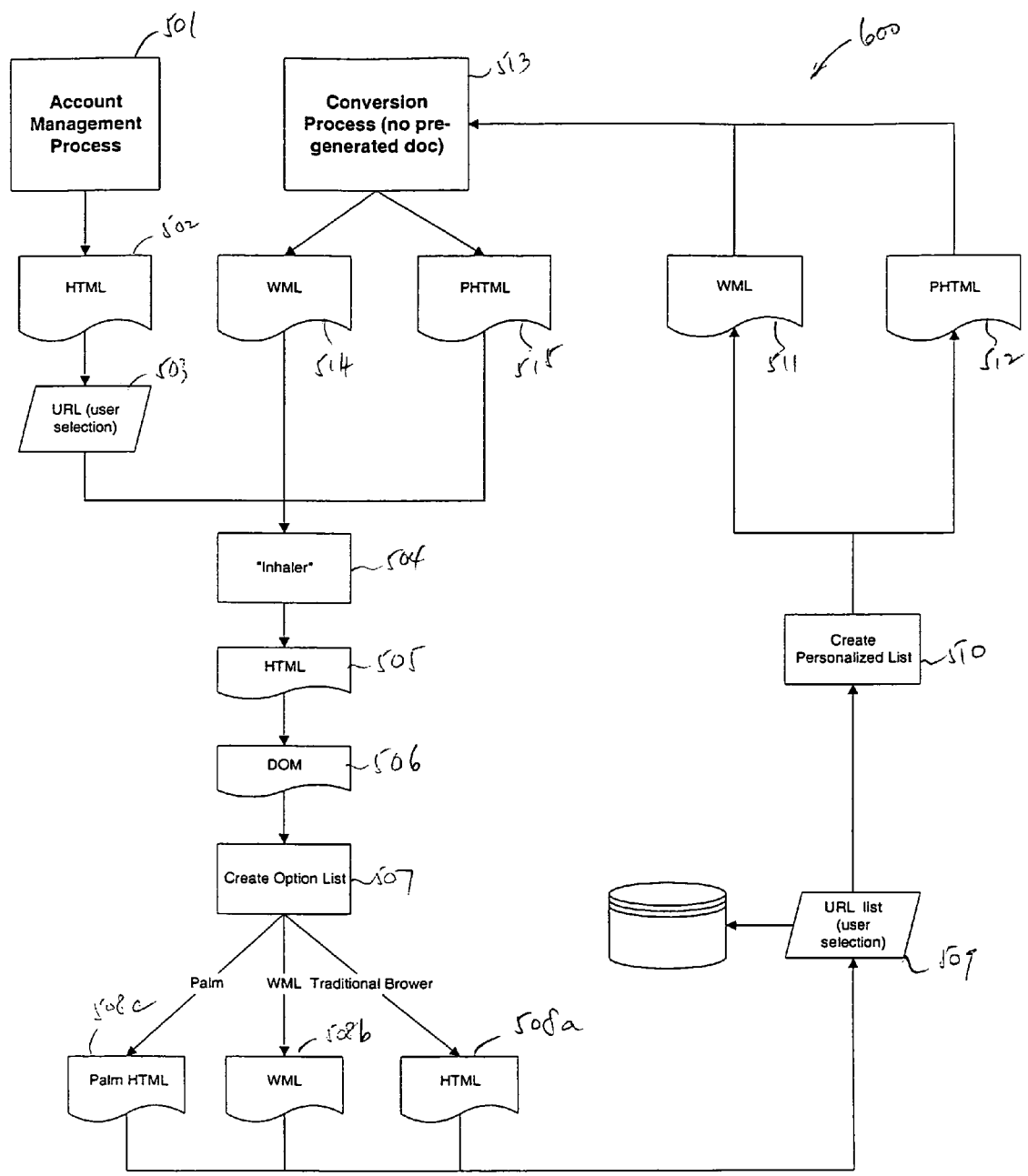
FIG. 5 is a block diagram illustrating procedure 500, which creates a bookmark for a first internet appliance, in accordance with an embodiment of the present invention.

FIG. 5 shows in further detail the bookmark creation or modification process, in accordance with the present invention. As shown in FIG. 5, during the management session 501, at step 502, management server 105 creates a web page (in HTML format, in this example) which is a menu or a form that solicits a user input of an URL. Upon receiving the URL, the web resource corresponding to the URL is retrieved as an HTML document (for example only) and parsed by a document manager, also whimsically called an "inhaler" (steps 504 and 505). The document manager or inhaler identifies the information units in the document to create a document object model (DOM) at step 506. From the DOM, the document manager creates an option list, which is presented to the user to allow the user to select the preferred information units using a conventional web browser (step 508*a*). Based on the user selections, a personalized list capturing the user's preferences is created (step 510). Based on the personalized list, processed documents suitable for display on specific devices (e.g., WML processed document 511 and PHTML processed document 512) are provided. (PHTML is a version of HTML typically used in a personal digital assistant or "Palm" device). In addition, in one embodiment, when the user accesses the processed document at a later time using the internet device, resources in the processed document (e.g., resources reachable from the hypertext links in the processed document) can similarly be processed (e.g., WML processed document 514 or PHTML processed document 515) using the steps 504-507 in the manner described above. An option list can be generated in a similar manner as described above with respect to step 508*a*. In this instance, the option list is presented to the user in the form suitable for the internet appliance, such as WML document (step 508*b*) or a PHTML document (step 508*c*). As in the instance of the user in front of a desk top computer, a user can enable customization through WML document 508*b* or PHTML document 508*c* from the mobile telephone or the palm device.

FIG. 3 is a flow diagram 300 illustrating the interactions between an internet appliance and portal 108 during an access to a web resource by the internet appliance, in accordance with the present invention. As shown in FIG. 3, when the user initiates access, the user first accesses the home page "Myweb2go" (the file "portal.wml"). Upon receiving request for this web page, portal 108 checks if the accessing device is a supported device (step 302). If the accessing device is not supported, a generic error page "errorMsg.wml" is returned (step 306). Otherwise, portal 108 checks whether or not the accessing device is a registered device (step 303). If it is not a registered device, the accessing device is registered using default settings (step 304). Thereafter, the channels and the processed list of bookmarks are made available to the user (step 305).

The above detailed description is provided to illustrate the specific embodiments of the present invention and is not intended to be limiting. Numerous modifications and variations within the scope of the present invention are possible. The present invention is set forth in the following claims.

We claim:

1. A method for customizing a structured markup language document and delivering said customized structured markup language document to an Internet appliance, comprising:

selecting a bookmark representing a structured markup language document from a list of bookmarks, wherein the bookmark in said list of bookmarks is associated with said internet appliance;

parsing information units in said structured markup language document after the selecting of the structured markup language document;

selecting one or more of said information units for delivery, said selecting performed by a management server device;

determining the Internet appliance's geographical location from outside that internet appliance;

creating in a database a second structured markup language document including said one or more of said information units, said second structured markup language document customized according to capabilities of and for delivery to said Internet appliance, and said second structured markup language document associated in said database with a specified user;

delivering to said Internet appliance a menu for selection of at least said second structured markup language document, said menu including as a selection item at least a bookmark representing said second structured markup language document; and including in said second structured markup language document information that is specific to the location of said Internet appliance.

2. A method as in claim 1, wherein said second structured markup language document comprises and XML document.

3. A method as in claim 1, further comprising creating a menu including said information units, said menu being adapted for selection by a user and being presented to said user on a graphical display.

4. A method as in claim 1, wherein said internet appliance comprises a mobile telephone.

5. A method as in claim 1, wherein said internet appliance comprises a personal digital assistant.

6. A method as in claim 1, wherein said internet appliance comprises a hand-held computer.

7. A method as in claim 1, further comprising, prior to said parsing, specifying said structured markup language document by a uniform resource locator (URL).

8. A method as in claim 1, including steps of delivering preconfigured resources in response to that location-specific information.

9. A method as in claim 1, wherein said preconfigured resources are updated at specified time intervals.

10. A method as in claim 1, wherein said second document is adapted for display on said internet appliance in accordance with a profile of said internet appliance.

11. A method as in claim 10, further comprising, prior to said selecting, creating said profile of said internet appliance.

12. A method as in claim 1, wherein the capabilities of said internet appliance comprise bandwidth capability of said internet appliance.

13. A method as in claim 1, wherein the capabilities of said internet appliance comprise display capability of said internet appliance.

14. A document customization system, comprising:

a management server offering a document customization service to a user;

a document manager associated with said management server for performing said document customization service to web pages identified by said user, said document customization service customizing said web pages according to capabilities of and for delivery to an internet appliance, said document customization service operable to determine the internet appliance's geographical location from outside that internet appliance, operable to parse information units in structured markup language documents for said web pages enabling the user to select one or more of said information units for delivery to the user;

a database accessible by said document manager, said database storing customized web pages resulting from said document manager performing said document customization service, said database including a user record identifying a user;

a portal for accessing said customized web pages in said database via bookmarks representing at least said customized web pages, wherein at least one of said bookmarks is associated with said internet appliance;

said portal is customized for access by an internet appliance; and said document customization system operable to include in said customized web pages information that is specific to the location of said internet appliance.

15. A document customization system as in claim 14, wherein said internet appliance comprises a personal digital assistant.

16. A document customization system as in claim 14, wherein said internet appliance comprises a mobile telephone.

17. A document customization system as in claim 14, wherein said internet appliance comprises a hand-held computer.

18. A document customization system as in claim 14, wherein said management server provides a web page based interface to said document manager.

19. A document customization system as in claim 14, wherein said customized web pages are stored in a hypertext format.

20. A document customization system as in claim 14, wherein said database comprises:

a device record identifying an internet appliance;

a client record identifying a browser running on said internet appliance;

a user client record associating said user record with said client record; and a device profile record associating said user-client record with said device record.

21. A document customization system as in claim 20, wherein said database further comprises a channel record associated with said user-client record, said channel representing a pre-configured resource.

22. A document customization system as in claim 20, wherein said database further comprises a site record associated with said user-client record, said site record representing a specified resource.

23. A document customization system as in claim 22, said database further comprises a customization record associated with said site record, said customization record representing modification of said resource in accordance with said device profile record.

* * * * *